PROCESS FOR REDUCING THE FAR-END CROSSTALK BETWEEN CONCENTRIC PAIRS DUE TO TERTIARY CIRCUITS

Filed March 13, 1947 3 Sheets-Sheet 1

Inventor:
Guerchon Fuchs
By Hinkle, Horton, Ahlberg, Hausmann & Wupper
Attorneys.

Oct. 24, 1950 G. FUCHS 2,526,942

PROCESS FOR REDUCING THE FAR-END CROSSTALK BETWEEN CONCENTRIC PAIRS DUE TO TERTIARY CIRCUITS

Filed March 13, 1947 3 Sheets-Sheet 2

INVENTOR:

GUERCHON FUCHS,

By Hinkle, Horton, Wildberg, Hansmann & Wupper

ATTORNEYS.

Oct. 24, 1950 G. FUCHS 2,526,942

PROCESS FOR REDUCING THE FAR-END CROSSTALK BETWEEN CONCENTRIC PAIRS DUE TO TERTIARY CIRCUITS

Filed March 13, 1947 3 Sheets-Sheet 3

Inventor:
Guerchon Fuchs
By Hinkle, Horton, Ahlberg, Haensmann & Wupper
Attorneys.

Patented Oct. 24, 1950 2,526,942

UNITED STATES PATENT OFFICE 2,526,942

PROCESS FOR REDUCING THE FAR-END CROSSTALK BETWEEN CONCENTRIC PAIRS DUE TO TERTIARY CIRCUITS

Guerchon Fuchs, Paris, France, assignor to Societe Anonyme de Télécommunications, Paris, France, a corporation of the French Republic Application March 13, 1947, Serial No. 734,478
In France April 15, 1946

9 Claims. (Cl. 179—78)

It is known that the crosstalk between two concentric pairs is influenced by the co-existence in the cable of other types of circuits playing the part of tertiary circuits, for example symmetrical circuits, such as telephone pairs of quads or the metallic sheath protecting the cable core.

One also knows that the concentric pairs intended to transmit high frequencies of an order of several megacycles per second have smaller amplification sections than those of other circuits so that one is obligated to provide intermediate repeater stations in which the currents transmitted by the concentric pairs are amplified, whereas the other circuits traverse the stations without being cut. This circumstance increases still more the part played by the additional crosstalk via the tertiary circuits in the case of long distance communications comprising a great number of points of amplification.

In a composite cable comprising several concentric pairs, the crosstalk between two pairs distant from each other is generally substantially conditioned by the indirect crosstalk via the tertiary circuits formed by the outer tubular conductors of the concentric pairs. Such is the practical case which arise for instance in a 4 pair concentric composite cable between the diametrically opposite pairs.

It results from what has been exposed hereabove that a compensation of the indirect crosstalk between concentric pairs transmitting in the same direction is highly desirable.

Several methods have already been proposed in view of reducing the principal or direct crosstalk. One of these known methods consists in opposing the induced currents on a section of the cable by crossing the conductors of a concentric pair in its middle. This method may be embodied for example with aid of a crossing transformer, or again with the aid of phase shifting networks which make the phase of the current turn by an angle equal to $\pi$ or still with the aid of a stage of vacuum tubes.

The transposition may besides be made not in the middle of a section of the cable, but also at the exit of a line amplifier, the compensation acting then on the entireness of two amplification sections.

The applicant has found that the compensation effected in these conditions affects but the direct crosstalk, leaving a non-negligible component of indirect crosstalk which may sometimes render the crossing operation completely inefficient.

One of the objects of the present invention is to reduce the indirect crosstalk at the same time as the direct crosstalk.

Another object of the invention is to reduce both direct and indirect crosstalks by acting simultaneously on the phase of the induced crosstalk currents and on the longitudinal transmission characteristics of the outer return conductors of the concentric pairs.

According to a further object of the invention the propagation constants of the concentric pairs and of the tertiary circuits formed by the outer return conductors of said concentric pairs are adapted to the total amplification coefficient of the repeater in a manner to reduce the indirect far-end crosstalk, whereas the direct crosstalk is eliminated by suitably phase shifting the crosstalk currents induced in the different sections of the pair so as to make them compensate one another.

With these and other objects in view the present invention mainly consists in establishing between the last amplification section and the originating section of the circuit a total phase shift equal to an odd number of $\pi$, and in adapting the propagation constants of the tertiary circuits and of the concentric pairs so that the ratio of their sum in respect to their difference should be equal to the total amplification coefficient of the repeater.

One embodiment of the present invention will be described hereafter with reference to the accompanying drawing wherein:

Fig. 1*d* is a diagram illustrating the calculations whereupon the invention is based.

Fig. 1 diagrammatically shows the connections between the successive section of concentric pairs.

The method of calculation of the crosstalk between concentric pairs are well known. $u_1$, $i_1$ being the voltage and the current in the disturbing pair at a point having an abscissae $x$; $u_2$, $i_2$ being the corresponding voltage and current in the disturbed pair and $u'$, $i'$ the corresponding voltage and current in the tertiary circuit formed by the outer conductors of said pairs, $Z_0$ and $g$ being the transfer impedance and the propagation constant of the concentric pairs, $Z'_0$ and $g'$ the corresponding characteristics of the tertiary circuit, $Z_T$ the transfer impedance of the return conductor and E the disturbing voltage, this calculation results in integrating the following system of differential equations:

$$\frac{di_1}{dx}=\frac{g}{Z_0}u_1 \qquad \frac{du_1}{dx}=gZ_0i_1$$

$$\frac{di'}{dx}=\frac{g'}{Z'_0}u' \qquad \frac{du'}{dx}=g'Z'_0i'+E$$

$$\frac{di_2}{dx}=\frac{g}{Z_0}u_2 \qquad \frac{du}{dx}=gZ_0i_2+Z_Ti'$$

This system has been already integrated in many particularly simple cases. I have thoroughly studied the practical case when repeaters are inserted in the circuit and where the transposition method is eventually used for the concentric pairs.

Figure 1:
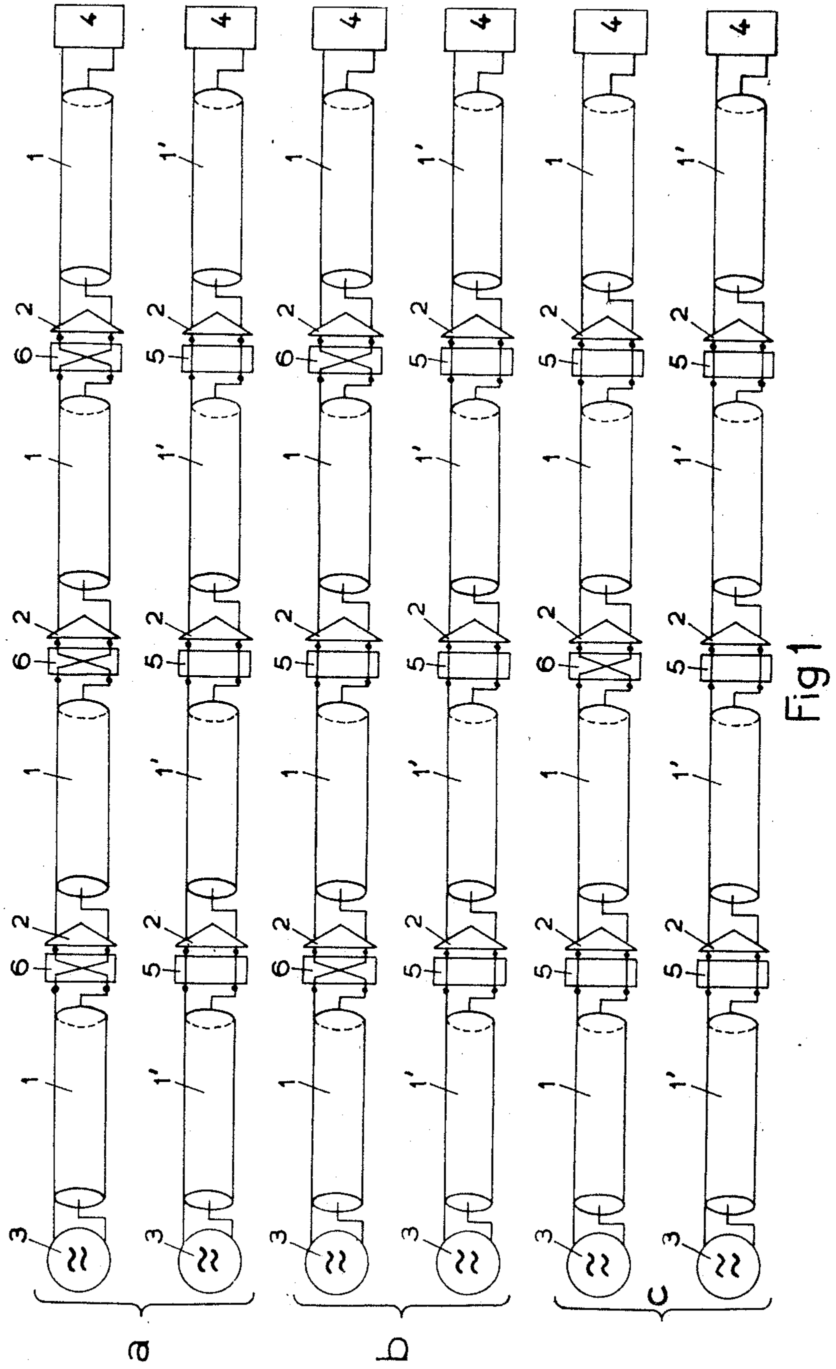
Figure 1D:
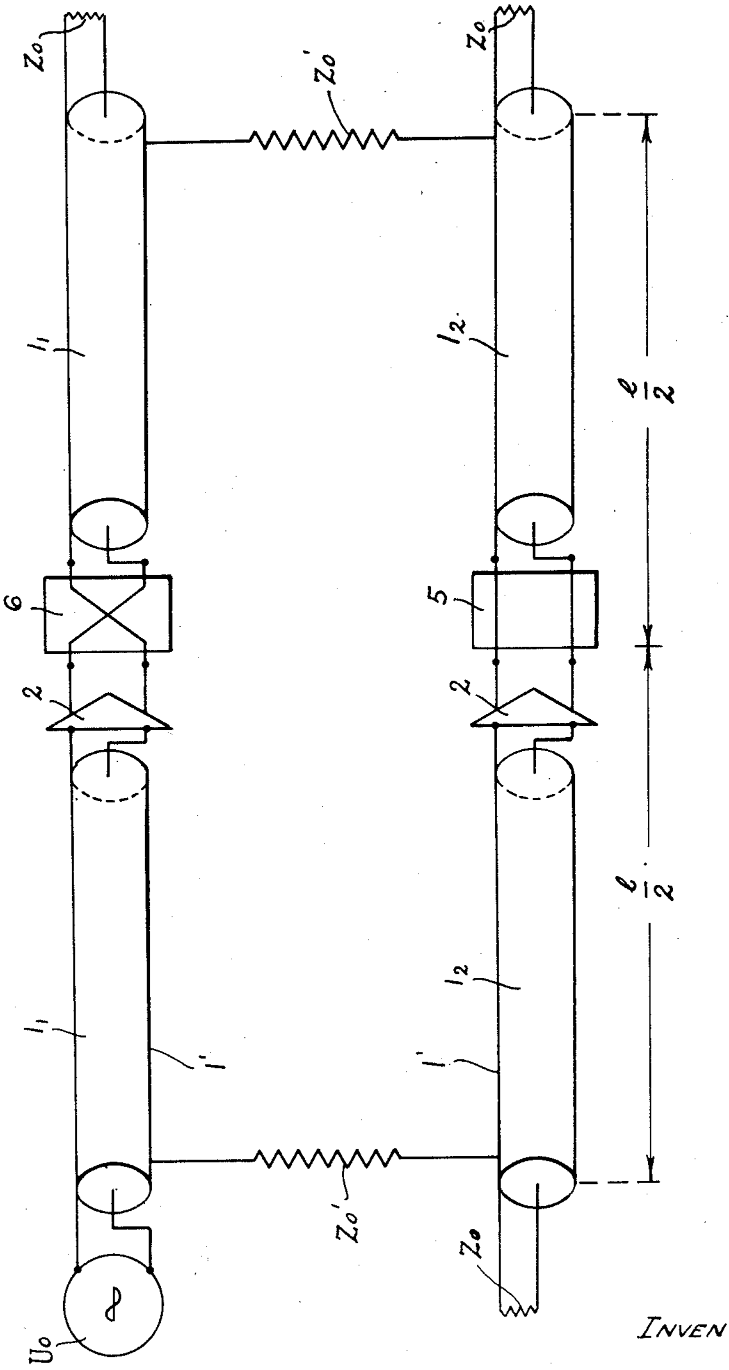

Fig. 1*d* shows a distributing concentric pair 1$_1$ provided in the middle of a section having a length 1 with a line-repeater 2 and with a connecting device 6 reversing the connections of the conductors beyond the repeater 2; the pair 1$_1$ is connected at one end to a source of voltage $u_0$, and closed on its other end on its characteristic impedance $Z_0$. The disturbed pair 1$_2$ is provided with repeater 2 and direct connecting device 5, and it is closed on both ends on impedance $Z_0$, whereas the tertiary circuit 1' is closed on both ends on its characteristic impedance $Z'_0$. The impedances of the repeaters and of the connecting devices are supposed to be matched with respect to the line impedance.

The disturbing voltage E has not the same value along the whole length 1: at the left side of the repeater its value is $$E=u_0\frac{Z_T}{Z_0}e^{-gx}$$

and on the right side of the repeater $$E=-u_0\frac{Z_T}{Z_0}Ae^{-gx}$$

A being the amplification coefficient of the receiver.

Due account being taken of the limit conditions, the integrating of the differential system shows that the far-end crosstalk voltage $u_2$ is proportional to the function $$\varphi=\frac{1}{2A}\frac{g'}{(g'-g)^2}[1-e^{-(g'-g)\frac{l}{2}}]^2-\frac{A}{2}\frac{g'}{(g'+g)^2}[1-e^{(-g'+g)\frac{l}{2}}]^2$$

Function $\varphi$ becomes equal to zero if $$A=\frac{g'+g}{g'-g}\,\frac{1-e^{-(g'-g)\frac{l}{2}}}{1+e^{-(g'+g)\frac{l}{2}}}$$

The attenuation is practically sufficiently high to enable this equality to be written $$A=\frac{g'+g}{g'-g}$$

which is the condition which is to be satisfied for obtaining the compensation between the crosstalk voltage originating from two amplification sections.

The calculation above may be generalized first by taking account of the lead sheath common to both pairs, and second by admitting that the compensation of the crosstalk voltage is extended to N sections instead of two sections only.

In this respect the calculations effected by the applicant have shown that in the hypothesis that the attenuation of the tertiary circuits on a section of amplification is higher than 20 decibels, hypothesis always verified in practical cases, the far-end crosstalk potential difference between two concentric pairs is proportional to:

$$Q=\frac{g'^2l}{g'^2-g^2}\sum_{q=1}^{N}k_q+\frac{g'}{2(g'-g)^2}\left[\left(\frac{1}{A}-1\right)\sum_{1}^{N-1}\cdot k_q-k_N\right]+\frac{g'}{2(g'+g)^2}\left[-k_1+(A-1)\sum_{2}^{N}k_q\right] \quad (1)$$

where $l$ is the length of a section of amplification

N the number of connected sections $g'$ the propagation constant of the tertiary circuit $g$ the propagation constant of the concentric pair A the amplification factor of the repeater (ratio between the output tension and the input tension) comprising the amplifier itself, the distorsion compensating networks, etc.

$k_q=+1$ if the total phase shift between the $q^{tht}$ and the first sections introduced by the phase shifting devices mentioned above is equal to an even number of times $\pi$.

$k_q=-1$ if this total phase shift is equal to an odd number of times $\pi$.

The first term characterizes the direct crosstalk, the two other terms correspond to the indirect crosstalk.

If the phase shifts are chosen in a manner to compensate the direct crosstalk $$\sum_{q=1}^{N}k_q=0 \quad (2)$$

there remains $$Q=-\frac{g'}{2(g'-g)^2}\frac{k_N}{A}-\frac{g'A}{2(g'+g)^2} \quad (3)$$

The indirect crosstalk depends only on the total phase shift of the last section of amplification.

To render Q as small as possible, one must first of all, and that constitutes a first characteristic of the present invention, make $$k_N=-1 \quad (4)$$

i. e. that the compensation of the indirect crosstalk must be conducted in a manner that the total phase shift introduced by the crossing devices between the last section of amplification and the originating section should be equal to an odd number of $\pi$.

This condition will be better understood with the aid of the following example illustrated by Fig. 1 where a telephone cable comprising two coaxial pairs 1, 1' and provided with three repeaters 2 between transmitter 3 and receiver 4 has been diagrammatically shown. The reference character 5 denotes direct connections between a section of the cable and the repeater and the reference character 6 denotes a reversed connection.

Let a crosstalk on 4 amplification sections to be compensated.

A priori, three solutions are conceivable to fulfill the condition (2):

| | | | | |
|---|---|---|---|---|
| (1*a*) | $k_1=1$ | $k_2=-1$ | $k_3=+1$ | $k_4=-1$ |
| (1*b*) | $k_1=1$ | $k_2=-1$ | $k_3=-1$ | $k_4=+1$ |
| (1*c*) | $k_1=1$ | $k_2=+1$ | $k_3=-1$ | $k_4=-1$ |

The solutions (1*a*) and (1*c*) satisfy simultaneously the condition (4).

The indirect crosstalk is then proportional to:

$$Q=\frac{g'}{2(g'-g)^2}\frac{1}{A}-\frac{g'}{2(g'+g)^2}A \quad (5)$$

According to a second characteristic of the invention, the relationship $$A=\frac{g'+g}{g'-g} \qquad (6)$$

is realized in a manner to cancel the expression (5) of Q.

Among the parameters A, $g$ and $g'$ forming the relation (6), the amplification A and the propagation constant $g$ of the coaxial pair may be considered as given; they are determined as soon as the type of the coaxial pair has been chosen. In order to practically satisfy to condition (6), the propagation constant $g'$ of the tertiary circuit will be acted on. The main term of said constant $g'$ is the phase constant approximately given by the formula $$a'=w\sqrt{LC}$$

where $w$ is the angular velocity $2f\pi$ corresponding the considered frequency $f$, C the capacity and L the self inductance of the tertiary circuit.

If the amplification A has a high value, it is clear that the value of $g'$ to be chosen must be slightly different from $g$ in order that denominator $(g'-g)$ be decreased and the ratio $$\frac{g'+g}{g'-g}$$

be increased. On the contrary, if the amplification A is nearly equal to 1, the value of $g'$ must be much higher than the value of $g$. A method of varying $g'$ by acting on the self inductance of the tertiary circuit will be described hereinafter.

One knows that the self induction L is the sum of two terms.

$$L=L_1+L_2$$

The geometric self induction $L_1$ does not depend on the frequency and the internal self induction $L_2$ is a function of the surface impedance of the return conductor of the concentric pairs.

This internal self induction is high when the pair's armouring is constituted by a steel tape of great permeability; it is low when the armouring is of non magnetic metal.

The experiments and calculations carried out by the applicant have shown that $a'$ could vary in considerable limits: from 2.2 rad./km. at 60 kilocycles per second for a lead sheath type of concentric pairs, to 4.6 rad./km. for a magnetic metal armouring type of concentric pairs. One conceives that it is possible to obtain intermediate values of $a'$ and consequently to vary the ratio:

$$\frac{g'+g}{g'-g}$$

by placing one self between the two limit cases mentioned above. If necessary it is possible of course to obtain greater values of $a'$ by using high permeability alloys.

A first means to realize the invention consists in suitably choosing the permeability of the exterior armouring of the concentric pairs.

For instance, if the propagation constant $g'$ is to be increased, a tape of a high permeability metal instead of an ordinary metal tape will be used.

A second means consists in surrounding the steel tape by a thin armouring of a non magnetic metal, aluminium, for example.

One has thus to do with a composite armouring, the surface impedance of which may be determined, and this method permits to choose the thickness of the tape in a manner to obtain an internal self induction $L_2$ corresponding to the desired value of $a'$.

The above method may be particularly used when the value of the propagation constant $g'$ must be decreased.

Figures 2, 3, 4:
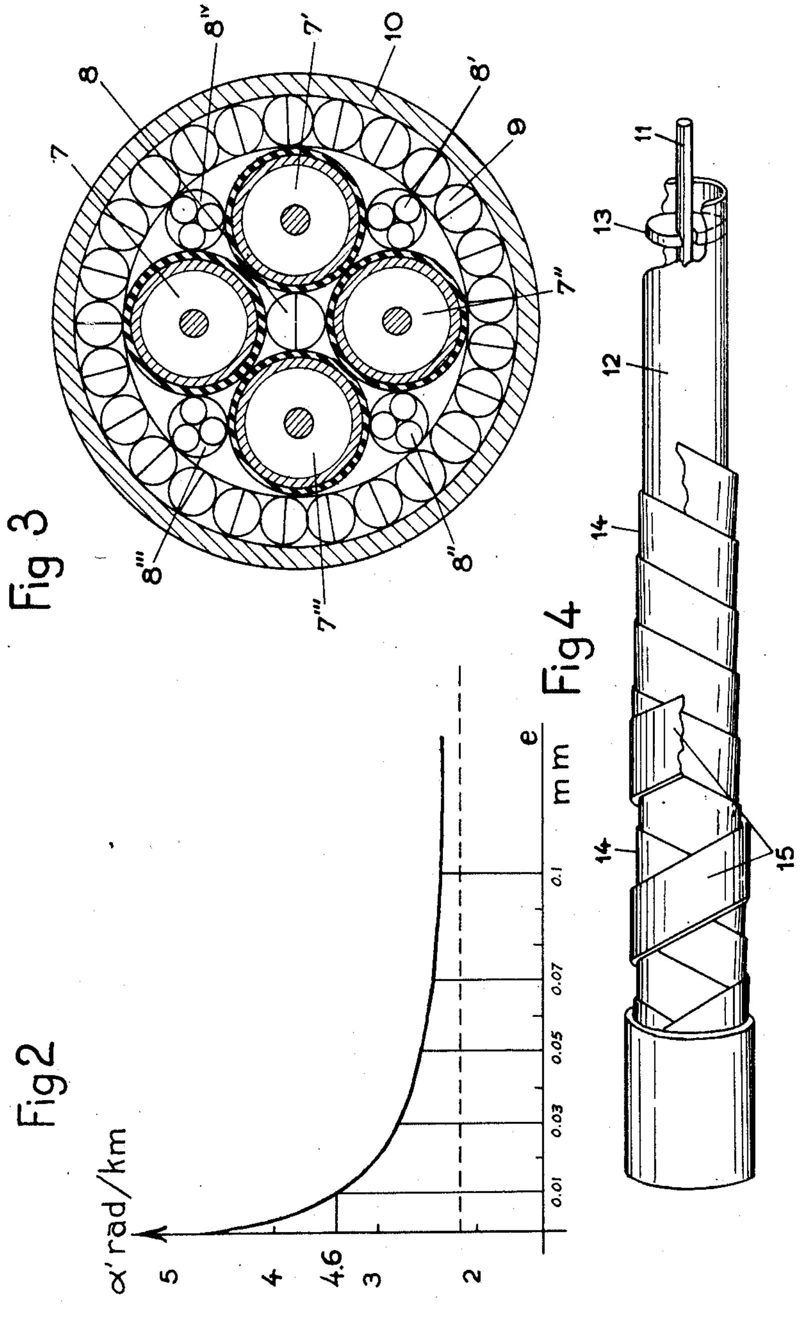
Fig. 2 shows the variation of the phase constant of the tertiary circuit as a function of the thickness of an aluminium tape wound on the outer conductor of a pair.
Figs. 3 and 4 show a cable according to the invention in sectional and longitudinal view respectively.

One has represented in Fig. 2, by way of example, the variation of $a'$ in function of the thickness $e$ of the aluminium tape at the frequency $f=$ 60 kilocycles per second.

If one was in need of a very slight thickness, it would be possible to replace the tape by metallized paper.

Other preconized means consist in utilizing non magnetic tape coiled in form of an open helix over the steel armouring. It is obvious that the effective permeability of this entireness will place itself between the permeability equal to the unity of the non magnetic tape and the high permeability of the magnetic armouring.

The desired value of $a'$ is obtained by suitable adjustment of the pitch and of the width and thickness of the tape.

The processes set forth hereabove are only given as indications and have by no means a limiting character.

Other means may be brought into action to attain the desired object, i. e. to realize the equality:

$$A=\frac{g'+g}{g'-g}$$

By way of example one will describe a particular embodiment of the invention, as applied to a composite cable which is shown in section in Fig. 3. This cable comprises coaxial pairs 7, 7', 7'', 7''' control and service circuits 8, 8', 8'', 8''' surrounded by a circular layer of telephone quads 9. The cable is provided with a lead protection 10 and is armoured.

The purpose is to compensate the indirect crosstalk between concentric pairs under steel tape armouring, the higher frequency of transmission being 2.8 mc. If one puts to 52 decibels the maximum attenuation on a section of amplification, the attenuation at 60 kc. is of 7.65 decibels. The corresponding coefficient of amplification is $A=2.4$, hence one deducts the ratio $$\frac{g'}{g}=2.4$$

The phase constant at 60 kc. of the concentric pair being $a=1.4$ rad./km., the phase constant $a'$ of the tertiary circuit is $a'=1.4, 2.4=3.4$.

Fig. 2 shows that thin value of $a'$ may be obtained by using very thin aluminium tape having a thickness slightly below 0.01 mm. and which is wound in such a manner that the successive turns adjoin one another. If it is desired to avoid the use of tapes having such a small thickness, it is possible to obtain the same effect by using a tape having a greater thickness, for instance 0.1 mm. but wound in an open helix. $x$ being the fraction of the surface of the protecting tape of the outer conductor of the pair which is covered by said aluminium tape 15, the fraction of said surface which remains uncovered is $(1-x)$.

According to the curve shown in Fig. 2, the phase constant is 2.3 rad./km. for $e=0.1$ mm. and 4.6 rad./km. for $e=0$, so that the resultant phase constant will be given by the expression $$2.3x+4.6(1-x)$$

Equalizing this expression to the desired value 3.4 rad./km., $x$ is found equal to 0.5, so that the part of the protecting sheath covered by the aluminium tape is approximately equal to the part remaining uncovered.

Fig. 4 is a view of the embodiment described above wherein the inner conductor 11 of the coaxial pair is separated from the outer tubular conductor 12 by means of insulating discs 13. The iron tape 14 is wound in a manner such that the turns of the helix partially overlap one another, whereas the aluminum tape 15 is wound in the form of an open helix so as to cover only one-half of the surface of the magnetic iron tape.

What I claim is:

1. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means whereby this condition is fulfilled by acting on the internal self induction value of the return conductors of the concentric pairs.

2. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means including an outer sheath, said sheath consisting of a magnetic metallic tape of suitable permeability, whereby the foregoing condition is fulfilled by said sheath acting on the internal self induction value of the return conductors of the concentric pairs.

3. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means including a wrapping of non-magnetic material whereby the foregoing condition is fulfilled by said wrapping acting on the internal self induction value of the return conductors of the concentric pairs.

4. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means including an aluminum wrapping whereby this condition is fulfilled by said wrapping acting on the internal self induction value of the return conductors of the concentric pairs.

5. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means including a metalized paper wrapping whereby this condition is fulfilled by said wrapping acting on the internal self induction value of the return conductors of the concentric pairs.

6. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means including a wrapping formed by a tape wound in an open helix of a particular pitch, thickness and width whereby return conductors of the concentric pairs.
this condition is fulfilled by said wrapping acting on the internal self induction value of the 7. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means including a wrapping formed by a tape of non-magnetic material wound in an open helix of a particular pitch, width and thickness whereby this condition is fulfilled by said tape acting on the internal self induction value of the return conductors of the concentric pairs.

8. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means including a wrapping formed of a tape having a high permeability, said tape being wound in an open helix of a particular pitch, width and thickness whereby this condition is fulfilled by said tape acting on the internal self induction value of the return conductors of the concentric pairs.

9. In a long distance composite telephone cable constituted by several amplification sections, comprising concentric pairs and symmetrical circuits such as twisted pairs and quads and provided with intermediate repeaters, means for reducing the indirect far end crosstalk between concentric pairs via tertiary circuits, which comprises means for establishing between the last section of amplification and the originating section of the circuit a total phase shift equal to an odd number of $\pi$ and means for adapting the propagation constants of the concentric pairs to that of the tertiary circuit so that the ratio of their sum to their difference be equal to the total amplification coefficient of the repeater, means whereby the concentric pairs are provided to this end with a first magnetic wrapping formed by an iron tape overlap wound on the outer return conductor and with a second nonmagnetic wrapping formed by an aluminum tape would in an open helix, and means whereby the pitch covers only half of the surface of the first magnetic wrapping.

GUERCHON FUCHS.

REFERENCES CITED

The following references are of record in the file of this patent:

UNITED STATES PATENTS

| Number | Name | Date |
|---|---|---|
| 1,852,902 | Rockewell | Apr. 5, 1932 |
| 1,871,906 | Nyquist | Aug. 16, 1932 |
| 1,978,419 | Dudley | Oct. 30, 1934 |
| 2,036,045 | Harris | Mar. 31, 1936 |
| 2,111,651 | Wentz | Mar. 22, 1938 |
| 2,119,853 | Curtis | June 7, 1938 |
| 2,152,706 | Mougey | Apr. 4, 1939 |
| 2,180,731 | Dickinson | Nov. 21, 1939 |
| 2,243,851 | Booth | June 3, 1941 |
| 2,245,492 | Meyer | June 10, 1941 |
| 2,319,744 | Mougey | May 18, 1943 |

FOREIGN PATENTS

| Number | Country | Date |
|---|---|---|
| 458,225 | Great Britain | Dec. 15, 1936 |
| 653,969 | France | Mar. 29, 1929 |
| 683,391 | France | Mar. 3, 1930 |